June 14, 1966  O. T. WELTEN  3,255,902
TRAILER FOR TRANSPORT OF CARS
Filed Oct 6, 1964
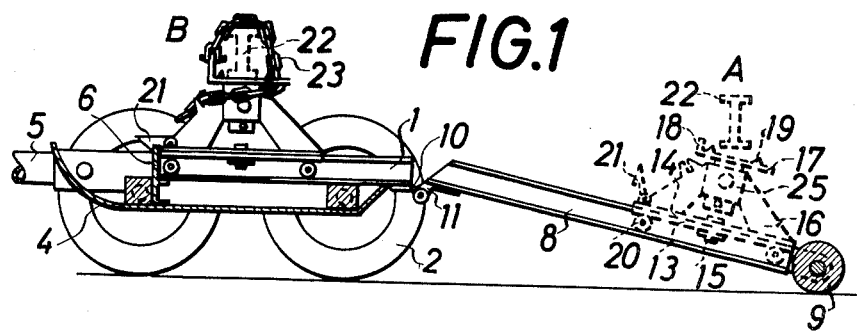
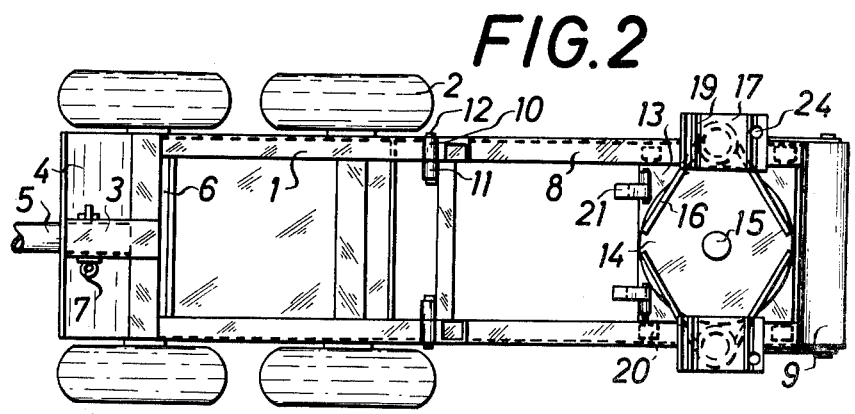
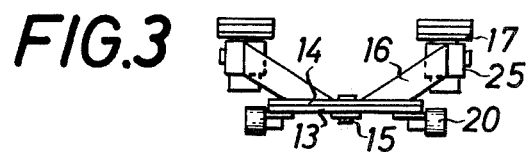
INVENTOR
Ottar Torolf Welten
BY Pennie, Edmonds, Morton, Taylor & Adams
ATTORNEYS United States Patent Office 3,255,902
Patented June 14, 1966

3,255,902
TRAILER FOR TRANSPORT OF CARS
Ottar Torolf Welten, "Solstad," Rute 2014,
Honefoss, Norway
Filed Oct. 6, 1964, Ser. No. 401,780
4 Claims. (Cl. 214—85)

The present invention relates to a trailer for the transport of automobiles and is mainly intended to replace break-down trucks having hoisting cranes, for transport of damaged automobiles to a repair shop. The whole trailer including its equipment is of such size that it may be stowed in the trunk of a medium sized passenger automobile and is eminently suitable for small repair shops, for whom the purchase of a regular break-down truck is too expensive.

The actual trailer consists of a framework, supported by two pairs of wheels and has at one end a tow bar which is connected to the service automobile. To the other end of the trailer a ramp is hinged, which inclines downwards and is provided at its free end with a roller or wheel which rests on the ground. Both the frame of the trailer and the sides of the ramp are provided with channel irons whose openings face each other, and in these channels roll four supporting wheels of a travelling trolley which is constructed with upwardly facing supporting members, intended for the support of the disabled automobile's front axle, cardan axle or other suitable part of the under carriage.

When the trailer is to be used, the travelling trolley rolls down over the ramp to the lower end portion of said ramp and the service automobile backs, so that the trailer together with the ramp and travelling trolley is pushed in under the front axle, for instance, of the disabled automobile, whereby the abutment on the supporting members of the travelling trolley abuts against the front axle, when the supporting members are in correct position underneath the front axle. The service automobile then backs further whereby the ramp glides further in under the travelling trolley which, with the front of the disabled automobile, is raised to the level of the channel irons on the trailer and rolls into these, where it is locked fast. The front end of the disabled automobile is now raised so that its front wheels are well off the ground. The ramp is loosened from the hinge connections with the trailer's channel irons and is removed, whereupon the front axle of the disabled automobile is tightly clamped or secured in another way to the supporting members of the traveling trolley, and the trailer is ready for the transportation of the disabled automobile. The supporting members of the travelling trolley are mounted on a turntable with a vertical pivot so as to permit turning while driving.

The invention is further described in the following in connection with the drawing, where:

FIG. 1 shows the trailer with the ramp seen from the side and partly in section, with the travelling trolley in its two end positions.

FIG. 2 is a plan view of the trailer, ramp and travelling trolley shown in FIG. 1 with the latter located in its initial position ready to be backed under the front axle of a disabled automobile.

FIG. 3 shows the travelling trolley seen from the front.

The trailer comprises two spaced longitudinal channel irons 1 together with two pairs of wheels 2, a base plate 4, a tubular fastening 3 for the tow bar 5. This is secured to the tubular member 3 with an easily detachable bolt 7, and is constructed from several demountable parts, and has internally a double acting spring which gives a resilient connection between the bar and the service automobile to which it is connected. The frame also comprises a transverse stiffening steel plate 6.

A hinge member 10 is attached to each of the trailer's longitudinal channel irons 1, said hinge member being connected to the hinge member 11 on each of the ramp's channel irons 8 by bolts 12 which are easily withdrawn. A roller 9 is mounted in the other end of the ramp. If desired, this may be replaced by several shorter rollers or by wheels.

The travelling trolley comprises a base plate 13 which is supported by four wheels 20, which fit into the openings of the channel irons 1 and 8. On the plate 13 a round plate 14 is mounted which is rotatable about a bolt 15 and acts as a turntable for the supporting members 17, which may be adjusted as to height by the respective bushings 25, secured to the disc 14 with ribs or supporting brackets 16. The supporting member 17 at each side has an abutment plate 18 and ribs 19 for securing, for instance, the front axle 22 when this is to be raised. The top plates of the supporting members are preferably covered with rubber plates.

In the position marked "A" the trailer with the ramp is pushed so far in under the disabled automobile that the supporting members of the travelling trolley are directly beneath the front axle 22, and, on pushing further, the abutment plate 18 will meet with the front axle and thereby raise this as the ramp of the trailer is pushed further in under the car, until the travelling trolley rolls from the channel irons 8 and into the trailer's channel irons 1 taking up the position marked "B." In this position the hook 21 on the travelling trolley is hooked over and grips the edge of the transverse plate 6 and locks the travelling trolley to the trailer.

The front axle 22 is shown in FIG. 1 as being secured by means of chains 23 which pass through the apertures 24 in the supporting members 17 (FIG. 2).

If the front axle is not high enough from the ground this may be remedied by swinging the trailer manually upwards about its rear wheel axle, whereby the ramp takes up a more horizontal position whilst it is being pushed in and consequently the top plate 17 of the travelling trolley in position A is closer to the ground.

The bottom plate 4 of the trailer serves also to give the trailer increased supporting power in the event of its rolling over soft ground where the wheels may sink.

I claim:

1. A trailer for use in lifting and transporting a disabled automobile comprising a framework having ground-engaging wheels, a pair of parallel guide members secured in spaced relation on top of said framework, a travelling trolley provided with wheels and supported by the latter in the said guide members, a pair of laterally spaced supporting members on the traveling trolley for engaging and supporting the front end of the disabled automobile, a ramp unit including a pair of spaced parallel guide members, means for detachably and pivotally securing one end of said ramp unit in its operative position at the rear end of the said framework with the guide members of said ramp extending downwardly at an incline respectively from the guide members on the said framework, ground-engaging roller means supporting the lower rear end of the ramp, the travelling trolley being freely movable along both sets of guide members to a position at the lower rear end of the said ramp and movable with the ramp to a position in which its engaging and supporting members engage the front end of the disabled automobile when the trailer and ramp are backed up to move the travelling trolley to a position under said front end, said trailer and ramp being movable backwards relative to the travelling trolley when the latter is in engagement with the said front end until the wheeled framework of the trailer is backed to a position under the trolley and the front end of the disabled automobile is supported thereby, whereby the wheeled framework of the trailer is substituted for the front wheels of the disabled automobile for transporting the automobile, and means for securing the traveling trolley to the trailer.

2. A trailer for use in lifting and transporting a disabled automobile as claimed in claim 1, in which the pair of guide members secured to the framework and the pair of guide members of the ramp are in the form of channel irons with the channels of each pair facing toward each other, thereby providing a track for the wheels of the travelling trolley.

3. A trailer for use in lifting and transporting a disabled automobile as claimed in claim 1, including means for adjusting the height of the engaging and supporting members on the travelling trolley, said adjusting means comprising at least one bushing fixed to the travelling trolley, a member operable therein and carrying an engaging and supporting member, and means for securing said operable member in a predetermined vertical position relative to the bushing.

4. A trailer for use in lifting and transporting a disabled automobile as claimed in claim 1, in which the engaging and supporting members of the travelling trolley are pivotally mounted thereon to permit turning on a vertical axis.

References Cited by the Examiner
UNITED STATES PATENTS

| | | |
|---|---|---|
| 2,111,341 | 3/1938 | Tetrault. |
| 2,389,338 | 11/1945 | Zorc _____ 214—85 X |
| 3,138,271 | 6/1964 | De Lay et al. _____ 214—85 |

GERALD M. FORLENZA, *Primary Examiner.*

A. J. MAKAY, *Assistant Examiner.*